( 12 ) United States Patent
Pankey et al.

(10) Patent No.: US 6,892,580 B2
(45) Date of Patent: May 17, 2005

(54) METHOD FOR DETERMINING A RATE OF RAIN

(75) Inventors: Brent W. Pankey, Ann Arbor, MI (US); Colin John Byrne, Ypsilanti, MI (US); Mark S. Ackerman, Howell, MI (US); Mitchell M. Rohde, Ann Arbor, MI (US); William J. Williams, Ann Arbor, MI (US)

(73) Assignee: AGC America, Inc., Ypsilanti, MI (US)

( * ) Notice: Subject to any disclaimer, the term of this patent is extended or adjusted under 35 U.S.C. 154(b) by 0 days.

(21) Appl. No.: 10/623,778

(22) Filed: Jul. 21, 2003

(65) Prior Publication Data

US 2005/0016275 A1 Jan. 27, 2005

(51) Int. Cl.[7] ............................................... G01H 17/00
(52) U.S. Cl. ........................ 73/570; 73/579; 73/170.17; 73/170.18; 318/DIG. 2; 318/344
(58) Field of Search .............................. 73/570, 170.17, 73/170.18, 579, 170.21; 318/DIG. 2, 343, 344, 443, 444

(56) References Cited

U.S. PATENT DOCUMENTS

| 4,527,105 | A | 7/1985 | Shiraishi |
| 4,542,325 | A | 9/1985 | Kobayashi et al. |
| 4,740,735 | A | 4/1988 | Hayashi |
| 5,017,847 | A | 5/1991 | Leistenschneider |
| RE33,848 | E | 3/1992 | Shiraishi |
| 5,119,002 | A | 6/1992 | Kato et al. |
| 5,140,233 | A | 8/1992 | Wallrafen |
| 5,140,234 | A | 8/1992 | Wallrafen |
| 5,252,898 | A | 10/1993 | Nolting et al. |
| 5,319,293 | A | 6/1994 | Levers |
| 5,453,670 | A | 9/1995 | Schaefer |
| 5,508,595 | A | 4/1996 | Schaefer |
| 5,568,027 | A | 10/1996 | Teder |
| 5,581,240 | A | 12/1996 | Egger |
| 5,684,464 | A | 11/1997 | Egger |
| 5,773,946 | A | 6/1998 | Montero |
| 5,872,437 | A | 2/1999 | Pientka et al. |
| 5,990,647 | A | 11/1999 | Zettler |
| 6,091,065 | A | 7/2000 | Teder |
| 6,144,022 | A | 11/2000 | Tenenbaum et al. |

(Continued)

FOREIGN PATENT DOCUMENTS

| EP | 0308990 A1 | 3/1989 | |
| GB | 2080555 | 2/1982 | |
| JP | 59045247 | 3/1984 | |
| RU | 1462182 | * 4/1986 | .......... G01N/29/02 |
| WO | WO-03027720 A1 | 4/2003 | |

OTHER PUBLICATIONS

Lavergnat et al., "A Stochastic Raindrop Time Distribution Model", Dec. 5, 1997, "American Meteorological Society" 1998, pp. 805–818.*

International Search Report for PCT International Application No. PCT/US2004/010855, Sep. 21, 2004.

Written Opinion of the International Searching Authority for PCT International Application No. PCT/US2004/010855, Sep. 21, 2004.

Primary Examiner—Hezron Williams
Assistant Examiner—Nashmiya Fayyaz
(74) Attorney, Agent, or Firm—Howard & Howard

(57) ABSTRACT

A method for determining a rate of rain falling on a surface. As rain falls and strikes the surface, vibrations are generated on the surface. The vibrations are sensed and a vibration signal is generated, the vibration signal being proportional to the vibrations of the surface. The vibration signal includes peaks. The peaks of the vibration signal are determined. The time intervals between the peaks are then determined. Using the time intervals, a number $n_1$ of timer intervals that occur between a first time and a second time are counted. A number $n_2$ of time intervals that occur between the second time and a third time are also counted. The rain rate $\lambda$ is then determined using an equation that is derived from a point process equation and utilizes $n_1$ and $n_2$.

29 Claims, 1 Drawing Sheet

U.S. PATENT DOCUMENTS

| | | |
|---|---|---|
| 6,175,205 B1 | 1/2001 | Michenfelder et al. |
| 6,184,642 B1 | 2/2001 | Ausiello |
| 6,268,612 B1 | 7/2001 | Teder |
| 6,275,231 B1 * | 8/2001 | Obradovich ................ 345/970 |
| 6,329,923 B2 | 12/2001 | Hog |
| 6,392,218 B1 | 5/2002 | Kuehnle |
| 6,397,161 B1 | 5/2002 | Tanaka et al. |
| 6,420,845 B1 | 7/2002 | Mackel et al. |

* cited by examiner

METHOD FOR DETERMINING A RATE OF RAIN

BACKGROUND OF THE INVENTION

1. Field of the Invention

The subject invention generally relates to a method for determining a rate of rain falling on a surface. More specifically, the subject invention relates to a method for determining the rate of rain falling on a surface with an equation derived from a statistical point process equation.

2. Description of the Related Art

Various methods for determining the rain rate are known in the art. One example of such a method is disclosed in U.S. Pat. No. 5,119,002. Specifically, the '002 patent discloses a method that includes the steps of detecting a vibration caused by raindrops. The vibration is detected by a sensor which produces an output. The method continues by calculating an intermittent period based on both the sensor output and a constant value. The intermittent period is used to actuate a windshield wiper to remove the raindrops. The method of the '002 patent does not contain provisions to differentiate vibrations caused by raindrops and vibrations caused by non-rain disturbances. Consequentially, the method cannot accurately determine a rain rate and will result in improper actuation of the windshield wiper.

Another example is disclosed in U.S. Pat. No. 5,017,847. The '847 patent discloses a method of detecting the vibrations caused by rain, converting the vibrations into electrical signals, then using the electrical signals to directly actuate the windshield wiper.

Due to the deficiencies in the methods of the prior art, including those described above, there remains an opportunity to introduce a method that is capable of determining a rain rate based on the principles of a point process. The point process provides a means to determine a very accurate rain rate, since rain exhibits characteristics of a point process. Conversely, non-rain disturbances are inherently removed from determination of the rain rate, since non-rain disturbances do not exhibit the characteristics of a point process.

SUMMARY OF THE INVENTION AND ADVANTAGES

The invention provides a method for determining a rate of rain falling on a surface. As rain falls and strikes the surface, the surface vibrates. The method includes the step of sensing the vibrations of the surface. A vibration signal is generated, the vibration signal being proportional to the vibrations of the surface. The vibration signal includes peaks. The method also includes the step of determining the peaks of the vibration signal. Intervals of time between the peaks are then determined. Using the intervals of time, a number $n_1$ of intervals of time that occur between a first time and a second time are counted. The number $n_1$ of intervals of time falls within a first range. A number $n_2$ of intervals of time that occur between the second time and a third time are also counted. The number $n_2$ of intervals of time falls within a second range. The rain rate $\lambda$ is then determined using an equation that is derived from a point process equation and utilizing $n_1$ and $n_2$.

The natural vibrations caused by rain exhibit the properties of a point process. However, vibrations caused by non-rain disturbances do not exhibit the properties of a point process. An accurate rain rate is established by the subject invention due to the use of the equation derived from the point process equation. The point process equation inherently differentiates between vibrations caused by rain and vibrations caused by non-rain disturbances, such as audio waves, wind, and a running engine.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
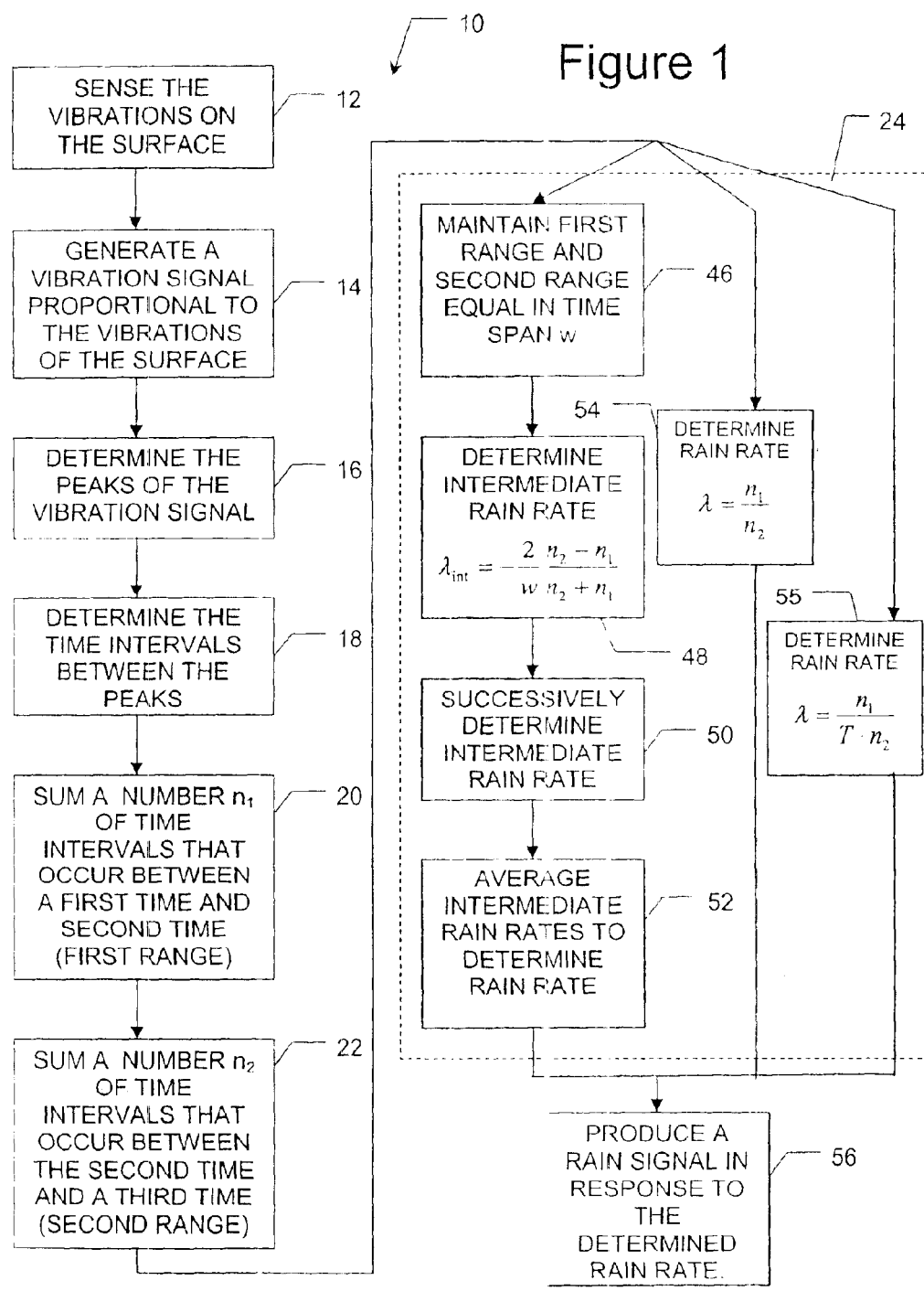
FIG. 1 is block diagram illustrating a method for determining a rate of rain falling on a surface according to the present invention.

Referring to FIG. 1, wherein like numerals indicate like or corresponding steps, a method for determining a rate of rain falling on a surface is generally disclosed at 10. As rain falls and strikes the surface, the rain causes the surface to vibrate. Preferably, the surface is a glazing of a vehicle, but could be any surface capable of vibrating when struck by rain, such as a hood or roof of a vehicle. Those skilled in the art will appreciate that the term "glazing" refers to a windshield, rear window, side window, etc. of a vehicle. Other disturbances from non-rain sources, such as wind, audio waves, a running engine, etc., may also cause the surface to vibrate. The method described herein determines a rate of rain falling on the surface while inherently removing disturbances caused by non-rain sources.

Referring to FIG. 1, one embodiment 10 of the method of the present invention begins with the step 12 of sensing the vibrations of the surface. Preferably, a piezoelectric vibration sensor is connected to the surface for sensing the vibrations of the surface. However, those skilled in the art will realize that other sensors or apparatus for sensing the vibrations could also be utilized, such as potentiometric or variable reluctance-type accelerometers.

The method continues with the step 14 of generating a vibration signal proportional to the vibrations of the surface. The vibration signal includes peaks representing vibrations that occur when a raindrop strikes the surface. The piezoelectric sensor of the preferred embodiment generates an analog electrical signal as the vibration signal. Other non-rain disturbances may also cause peaks in the vibration signal.

The method also includes the step 16 of determining the peaks of the vibration signal and the step 18 of determining intervals of time between the peaks. It is preferred that these steps are performed by a microprocessor that is operatively connected to the piezoelectric vibration sensor. However, those skilled in the art will appreciate that other devices, including but not limited to microcontrollers, application specific integrated circuits, and analog circuits, are capable of performing these steps.

The method continues with the step 20 of counting a number n1 of intervals of time that occur between a first time and a second time and that fall in a first range of the intervals of time. In the next step 22, the method counts a number n2 of intervals of time that occur between the second time and a third time and that fall in a second range of the intervals of time. Those skilled in the art will appreciate that the first and second ranges are also known as "statistical bins", or simply "bins".

The rain rate λ is determined with an equation that is derived from a statistical point process equation in step 24. An exponential density function of a first order point process is represented by the equation $f(t)=\lambda e^{-\lambda t}$, for t>0, where λ represents the rain rate, t represents time, and e represents the exponential function. Those skilled in the art understand that the exponential function e is an irrational number whose numerical value is approximately 2.71828. The vibrations caused by rain exhibit the characteristics of a point process, also known as a Poisson process. However, other vibrations caused by non-rain disturbances, such as audio waves, wind, and the running engine, do not exhibit the characteristics of the point process. Therefore, the vibrations caused by the non-rain disturbances do not significantly effect the determination of the rain rate λ, according to the present invention.

In a preferred embodiment, an analog-to-digital converter (ADC) is operatively connected to the vibration sensor. The microprocessor is operatively connected to the ADC. The method further includes the step of generating a series of digital values that are representative of the vibration signal. Each digital value has a magnitude component and a time component. Preferably, the ADC generates the magnitude component and the microprocessor generates the time component. However, it should be appreciated that different hardware configurations can be used to generate the magnitude and time component of each digital value.

The method of the preferred embodiment also includes the step of modifying the magnitude components of the digital values to enhance the peaks of the vibration signal. Enhancing the peaks of the vibration signal allows for easier determination of the peaks by the microprocessor. The step of modifying the magnitude components of the digital values to enhance the peaks of the vibration signal is preferably broken down into three separate steps. First, the step of detecting a first magnitude v(n−1), a second magnitude v(n), and a third magnitude v(n+1) is performed. These three magnitudes are consecutive digital values. Next, an enhanced magnitude $v_e(n)$ is computed with an equation $v_e(n)=v^2(n)-A\cdot v(n-1)\cdot v(n+1)$, wherein A is a scaling number selected to maximize the enhancement of peaks. Finally, the step of successively determining enhanced magnitudes $v_e(n)$ to provide an enhanced series of digital values is executed. Each enhanced digital value has an enhanced magnitude component and the time component.

In order to determine the peaks of the vibration signal, the preferred embodiment uses a multi-step process. Preferably, this process is performed by the microprocessor. The process begins with the step of sorting the enhanced series of digital values by the magnitude component of each digital value. The process continues with the step of discarding all digital values with magnitude components that are not greater than a certain threshold from the enhanced series of digital values. The certain threshold is determined to separate signal "noise" from significant disturbances to the signal. The certain threshold is based on various factors, including, but not limited to, sensitivity of the vibration sensor, amplification of the vibration signal, and resolution of the ADC. An ancillary step in the process is determining the certain threshold based on a size of a droplet of rain. For example, in a rainstorm with small and light droplets, the certain threshold would be different from the certain threshold in a rainstorm with large and heavy droplets.

The process continues with determining the largest enhanced magnitude in the enhanced series of digital values to identify a valid peak. Then, a next largest enhanced magnitude component in the enhanced series of digital values is determined to identify another valid peak. The next largest enhanced magnitude is a set time apart from the largest enhanced magnitude component. The set time, typically in the order of milliseconds, is based on a number of factors (resolution of the ADC, etc.). The process concludes with the step of successively determining the next largest enhanced magnitude component in the enhanced series of digital values that is a set time apart from any of the valid peaks to identify additional valid peaks. Once a valid peak is determined, the process ensures that another peak is not found to be "valid" within the set time on either side of the valid peak. This assures that up and down swings related to a peak are not identified as valid peaks.

In another embodiment, a different technique is used to determine the peaks of the vibration signal. This technique begins with the step of analyzing each digital value as the digital value is generated from the vibration signal. This is done to determine if the magnitude component of the digital value exceeds a certain threshold. This technique can also be practiced by substituting the enhanced digital value for the digital value. The technique continues with the step identifying a valid peak when the magnitude component of the digital value first exceeds the certain threshold. The technique concludes by starting a timer to run for a certain time when the magnitude component of the digital value exceeds the certain threshold. The technique does not allow the identification of other valid peaks while the timer is running. The length of the timer is longer than a refractory time caused by a droplet of rain striking the surface. Also, the certain threshold may be varied based on a size of droplets of rain.

In order to easily determine the rain rate λ using the microprocessor, three different alternative embodiments have been developed. However, it will be realized, by those skilled in the art, that other alternative embodiments based on the point process could also be developed.

A first alternative embodiment involves solving for the rain rate λ by taking a mathematical derivative of the exponential density function of a first order point process.

The derivative of f(t) is $f'(t)=-\lambda^2 e^{-\lambda t}$, which can be rewritten as $f'(t)=-\lambda \cdot f(t)$. Solving for the rain rate λ yields $$\lambda = -\frac{f'(t)}{f(t)}.$$

The equation for the rain rate listed above used functions that are continuous over time. The microprocessor of the preferred embodiment utilizes discrete values to find the rain rate λ. Therefore, the equation is rewritten $$\lambda = -\frac{f'(m)}{f(m)},$$

where m represents the ranges, or statistical bins, of intervals of time that are used to discretely approximate f(t) and f'(t).

Two of the statistical bins can then be used to determine an intermediate rain rate $\lambda_{int}$. By solving for f'(m) and f(m), the equation for determining the intermediate rain rate $\lambda_{int}$ is determined, where $n_1$ and $n_2$ are the statistical bins and w is the width of the statistical bin having a unit of time.

$$f'(m) = \frac{n_2 - n_1}{w}$$

-continued $$f(m) = \frac{n_2 + n_1}{2}$$

$$\lambda_{int} = -\frac{2}{w}\frac{n_2 - n_1}{n_2 + n_1}$$

Using several of the statistical bins, multiple solutions for $\lambda_{int}$ are determined. Averaging the multiple solutions for $\lambda_{int}$ together yields the rain rate $\lambda$.

The first alternative embodiment for solving for the rain rate $\lambda$ can be summarized as follows. First is the step 46 of maintaining the first range and the second range of intervals of time equal in a time span w. All statistical bins must have the same size with respect to time. Next, the step 48 of determining an intermediate rain rate $\lambda_{int}$ with an equation $$\lambda_{int} = -\frac{2}{w}\frac{n_2 - n_1}{n_2 + n_1}$$

is performed. The method of the first alternative embodiment continues with the step 50 of successively determining the intermediate rain rate $\lambda_{int}$. For example, in a first iteration a first and a second bin are used to determine the intermediate rain rate $\lambda_{int}$. In a second iteration, the second bin and a third bin are used to determine another intermediate rain rate $\lambda_{int}$, and so on. Finally, the intermediate rain rates $\lambda_{int}$ are averaged together to determine the rain rate $\lambda$ in the concluding step 52.

A second alternative embodiment involves solving for the rain rate $\lambda$ by using an approximation with only two statistical bins. The first range of the time intervals is defined as all intervals of time less than or equal to the second time. The second range of the intervals of time is further defined as all intervals of time greater than the second time.

To show how the equation of the second alternative embodiment is determined, first, suppose the exponential density function of a first order point process is rewritten in discrete form $f(m) = \lambda e^{-\lambda m}$.

$$\sum_{m=1}^{\infty} \lambda e^{-\lambda m} \cong 1$$

The first bin is then estimated $$f(1) = \lambda e^{-\lambda}$$

$$\sum_{m=2}^{\infty} \lambda e^{-\lambda m} = e^{-\lambda} \sum_{m=1}^{\infty} \lambda e^{-\lambda m} = e^{-\lambda}$$

The second bin can be estimated as
Now solving for the rain rate $$\lambda = \frac{f(1)}{\sum_{m=2}^{\infty} f(m)} = \frac{\lambda e^{-\lambda}}{e^{-\lambda}} = \frac{n_1}{n_2}$$

The second alternative embodiment includes the step 54 of determining the rain rate $\lambda$ with an equation $\lambda = n_1/n_2$.

A third alternative embodiment also involves solving for the rain rate $\lambda$ using only two statistical bins. However, an equation of the third alternative embodiment will provide a more accurate determination of the rain rate $\lambda$ than the equation of the second alternative embodiment. The first range of the intervals of time is defined as all intervals of time less than or equal to the second time. The second range of the intervals of time is further defined as all intervals of time greater than the second time.

The equation of the third alternative embodiment is determined by starting with the equation of the exponential density function of a first order point $$f(t) = \lambda e^{-\lambda t}$$

process
and understanding that $$\int_0^{\infty} f(t)dt = 1$$

Then, $$\int_0^T f(t)dt = \int_0^T \lambda e^{-\lambda t} dt = 1 - e^{-\lambda T} = a \cdot n_1$$

where T represents the second time and "a" is a constant. Continuing, $$\int_T^{\infty} \lambda e^{-\lambda t} dt = \int_0^{\infty} \lambda e^{-\lambda(\theta+T)} d\theta = e^{-\lambda T} = a \cdot n_2$$

where t is substituted by $\theta + T$.
Now solving for the rain rate $\lambda$, $$\frac{n_1}{n_2} = \frac{1 - e^{-\lambda t}}{e^{-\lambda t}}$$

$$\frac{n_1}{n_2} = e^{\lambda T} - 1$$

$$e^{\lambda T} = \frac{n_1}{n_2} + 1$$

$$\lambda = \frac{1}{T}\ln\left(\frac{n_1}{n_2} + 1\right) \cong \frac{n_1}{T \cdot n_2}$$

when $\lambda T$ is small.

The third alternative embodiment includes the step 55 of determining the rain rate $\lambda$ with an equation $\lambda = n_1/(T^* n_2)$, where T represents the second time.

After the rain rate $\lambda$ is determined, the preferred embodiment further includes the step 56 of producing a rain signal in response to the determined rain rate $\lambda$. Typically, the rain signal is a digital signal that is transmitted to a wiper computer. Those skilled in the art will appreciate that the rain signal could also be an analog signal.

Once the rain signal is received by the wiper computer, the wiper computer then uses the rain signal to control a frequency of a windshield wiper based on the rain rate $\lambda$. Furthermore, an additional step of modifying the frequency of the windshield wiper is performed. Modification of the frequency is performed utilizing a hysteresis process. The hysteresis process uses the current frequency of the windshield wiper and the rain rate to modify the frequency, resulting in a smooth transition of the frequency.

Obviously, many modifications and variations of the present invention are possible in light of the above teachings. The invention may be practiced otherwise than as specifically described within the scope of the appended claims.

What is claimed is:

1. A method for determining a rate of rain falling on a surface wherein the rain causes vibrations of the surface, said method comprising the steps of:

sensing the vibrations of the surface;

generating a vibration signal proportional to the vibrations of the surface, wherein the vibration signal includes peaks;

determining the peaks of the vibration signal;

determining intervals of time between the peaks;

counting a number $n_1$ of intervals of time that occur between a first time and a second time and that fall in a first range of the intervals of time;

counting a number $n_2$ of intervals of time that occur between the second time and a third time and that fall in a second range of the intervals of time; and determining the rain rate $\lambda$ with an equation derived from a point process equation utilizing $n_1$ and $n_2$ in order to differentiate vibrations caused by rain from vibrations caused by non-rain disturbances.

2. A method as set forth in claim 1 further comprising the step of maintaining the first range and the second range of intervals of time equal in a time span w.

3. A method as set forth in claim 2 wherein the step of determining the rain rate $\lambda$ with an equation derived from a point process equation utilizing $n_1$ and $n_2$ is further defined as determining an intermediate rain rate $\lambda_{int}$ with an equation $\lambda_{int}=-2\cdot(n_2-n_1)/w\cdot(n_2+n_1)$.

4. A method as set forth in claim 3 further comprising the step of successively determining the intermediate rain rate $\lambda_{int}$ to produce a plurality of intermediate rain rates $\lambda_{int}$.

5. A method as set forth in claim 4 further comprising the step of averaging the plurality of intermediate rain rates $\lambda_{int}$ to determine the rain rate $\lambda$.

6. A method as set forth in claim 1 wherein the first range of the intervals of time is further defined as all intervals of time less than or equal to the second time, the second range of the intervals of time is further defined as all intervals of time greater than the second time, and the step of determining a rain rate $\lambda$ with an equation derived from a point process equation utilizing $n_1$ and $n_2$ is further defined as determining the rain rate $\lambda$ with an equation $\lambda=n_1/n_2$.

7. A method as set forth in claim 1 wherein the first range of the intervals of time is further defined as all intervals of time less than or equal to the second time, the second range of the intervals of time is further defined as all intervals of time greater than the second time, and the step of determining a rain rate $\lambda$ with an equation derived from a point process equation utilizing $n_1$ and $n_2$ is further defined as determining the rain rate $\lambda$ with an equation $\lambda=n_1/(T\cdot n_2)$, wherein T represents the second time.

8. A method as set forth in claim 1 further comprising the step of generating a series of digital values that are representative of the vibration signal, each digital value having a magnitude component and a time component.

9. A method as set forth in claim 8 further comprising the step of modifying the magnitude components of the digital values to enhance the peaks of the vibration signal.

10. A method as set forth in claim 9 wherein the step of modifying the magnitude components comprises the step of detecting a first magnitude $v(n-1)$, a second magnitude $v(n)$, and a third magnitude $v(n+1)$.

11. A method as set forth in claim 10 wherein the step of modifying the magnitude components further comprises the step of computing an enhanced magnitude $v_e(n)$ with an equation $v_e(n)=v^2(n)-A\cdot v(n-1)\cdot v(n+1)$, wherein A is a scaling number selected to maximize the enhancement of peaks.

12. A method as set forth in claim 11 wherein the step of modifying the magnitude components further comprises the step of successively determining enhanced magnitudes $v_e(n)$ to provide an enhanced series of digital values, each enhanced digital value having an enhanced magnitude component and a corresponding time component.

13. A method as set forth in claim 12 wherein the step of determining the peaks of the vibration signal comprises the step of sorting the enhanced series of digital values by the corresponding enhanced magnitude component of each enhanced digital value.

14. A method as set forth in claim 13 wherein the step of determining the peaks of the vibration signal further comprises the step of discarding all digital values with enhanced magnitude components that are not greater than a certain threshold from the enhanced series of digital values.

15. A method as set forth in claim 14 further comprising the step of varying the certain threshold based on a size of droplets of rain.

16. A method as set forth in claim 14 wherein the step of determining the peaks of the vibration signal further comprises the step of determining a largest enhanced magnitude component in the enhanced series of digital values to identify a valid peak.

17. A method as set forth in claim 16 wherein the step of determining the peaks of the vibration signal further comprises the step of determining a next largest enhanced magnitude component in the enhanced series of digital values that is a set time apart from the largest enhanced magnitude component to identify another valid peak.

18. A method as set forth in claim 17 wherein the step of determining the peaks of the vibration signal further comprises the step of successively determining the next largest enhanced magnitude component in the enhanced series of digital values that is a set time apart from any of the valid peaks to identify additional valid peaks.

19. A method as set forth in claim 8 wherein the step of determining the peaks of the vibration signal further comprises the step of analyzing each digital value as each digital value is generated from the vibration signal to determine if the corresponding magnitude component of said each digital value exceeds a certain threshold.

20. A method as set forth in claim 19 wherein the step of determining the peaks of the vibration signal further comprises the step of identifying a valid peak when the corresponding magnitude component of said each digital value first exceeds the certain threshold.

21. A method as set forth in claim 20 wherein the step of determining the peaks of the vibration signal further comprises the step of starting a timer to run for a certain time when the corresponding magnitude component of said each digital value exceeds the certain threshold for preventing identification of valid peaks while the timer is running.

22. A method as set forth in claim 21 further comprising the step of varying the certain threshold based on a size of droplets of rain.

23. A method as set forth in claim 12 wherein the step of determining the peaks of the vibration signal further comprises the step of analyzing each enhanced digital value as each enhanced digital value is generated to determine if the corresponding magnitude component of said each enhanced digital value exceeds a certain threshold.

24. A method as set forth in claim 23 wherein the step of determining the peaks of the vibration signal further comprises the step of identifying a valid peak when the corresponding magnitude component of said each enhanced digital value first exceeds the certain threshold.

25. A method as set forth in claim 24 wherein the step of determining the peaks of the vibration signal further comprises the step of starting a timer to run for a certain time when the corresponding magnitude component of said each enhanced digital value exceeds the certain threshold for preventing identification of valid peaks while the timer is running.

26. A method as set forth in claim 25 further comprising the step of varying the certain threshold based on a size of droplets of rain.

27. A method as set forth in claim 1 further comprising the step of producing a rain signal in response to the determined rain rate $\lambda$.

28. A method as set forth in claim 27 further comprising the step of actuating at least one wiper in response to the rain signal to remove rain from the surface.

29. A method as set forth in claim 28 wherein the wiper actuates at a frequency and the method further comprising the step of modifying the rain signal based on the frequency and the rain rate.

* * * * *